US009379906B2

(12) United States Patent
Sharma et al.

(10) Patent No.: US 9,379,906 B2
(45) Date of Patent: Jun. 28, 2016

(54) NETWORK APPLIANCE WITH INTEGRATED LOCAL AREA NETWORK AND STORAGE AREA NETWORK EXTENSION SERVICES

(75) Inventors: Samar Sharma, San Jose, CA (US); Chandramouli Radhakrishnan, San Jose, CA (US); Sameer Merchant, San Jose, CA (US); Anand Parthasarathy, Fremont, CA (US); Murali Basavaiah, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 790 days.

(21) Appl. No.: 13/351,612

(22) Filed: Jan. 17, 2012

(65) Prior Publication Data

US 2013/0182708 A1  Jul. 18, 2013

(51) Int. Cl.
*H04L 12/28* (2006.01)
*H04L 12/46* (2006.01)
*H04L 29/08* (2006.01)
*H04L 12/931* (2013.01)

(52) U.S. Cl.
CPC ............ *H04L 12/4625* (2013.01); *H04L 49/70* (2013.01); *H04L 67/1097* (2013.01)

(58) Field of Classification Search
CPC .. H04L 49/70; H04L 12/4625; H04L 67/1097
USPC ......................................................... 370/392
See application file for complete search history.

(56) References Cited

U.S. PATENT DOCUMENTS

| | | | |
|---|---|---|---|
| 8,312,188 B1 | 11/2012 | White et al. | |
| 2003/0035397 A1 | 2/2003 | Haller et al. | |
| 2003/0152182 A1* | 8/2003 | Pai et al. | 375/372 |
| 2006/0146814 A1* | 7/2006 | Shah et al. | 370/389 |
| 2006/0182143 A1 | 8/2006 | Lu | |
| 2006/0251067 A1* | 11/2006 | DeSanti et al. | 370/389 |
| 2007/0201655 A1 | 8/2007 | Shenfield | |
| 2007/0233893 A1 | 10/2007 | Karpoff | |
| 2009/0063696 A1 | 3/2009 | Wang et al. | |
| 2009/0296726 A1* | 12/2009 | Snively et al. | 370/401 |
| 2011/0110381 A1 | 5/2011 | Atkinson et al. | |
| 2011/0280572 A1* | 11/2011 | Vobbilisetty et al. | 398/45 |
| 2011/0307659 A1 | 12/2011 | Hans et al. | |
| 2012/0093035 A1* | 4/2012 | Kidambi et al. | 370/255 |

OTHER PUBLICATIONS

Cisco White Paper: Data Center Interconnect: Layer 2 Extension Between Remote Data Centers, May 2010.
Cisco White Paper: Cisco Delivers Enterprise-Class Next-Generation Acceleration Solution for Disaster Recovery and SAN Extension, Oct. 2009.
Cisco White Paper: "A Day in the Life of a Fibre Channel Frame," Cisco MDS 9000 Family Switch Architecture, Mar. 2006.
Kenji Yoshigoe, Dissertation: "Design and Evaluation of the Combined Input and Crossbar Queued (CICQ) Switch," Aug. 9, 2004.

* cited by examiner

*Primary Examiner* — Ayaz Sheikh
*Assistant Examiner* — Hai-Chang Hsiung
(74) *Attorney, Agent, or Firm* — Edell, Shapiro & Finnan, LLC

(57) ABSTRACT

Techniques and a network edge device are provided herein to extend local area networks (LANs) and storage area networks (SANs) beyond a data center while converging the associated local area network and storage area network host layers. A packet is received at a device in a network. It is determined if the packet is routed to a local or remote storage area network or local area network. In response to determining that the packet routed to a remote storage area network, storage area network extension services are performed with respect to the packet in order to extend the storage area network on behalf of a remote location. In response to determining that the packet is routed to a local local area network traffic, local area network extension services are performed with respect to the packet in order to extend the local area network on behalf of the remote location.

26 Claims, 15 Drawing Sheets

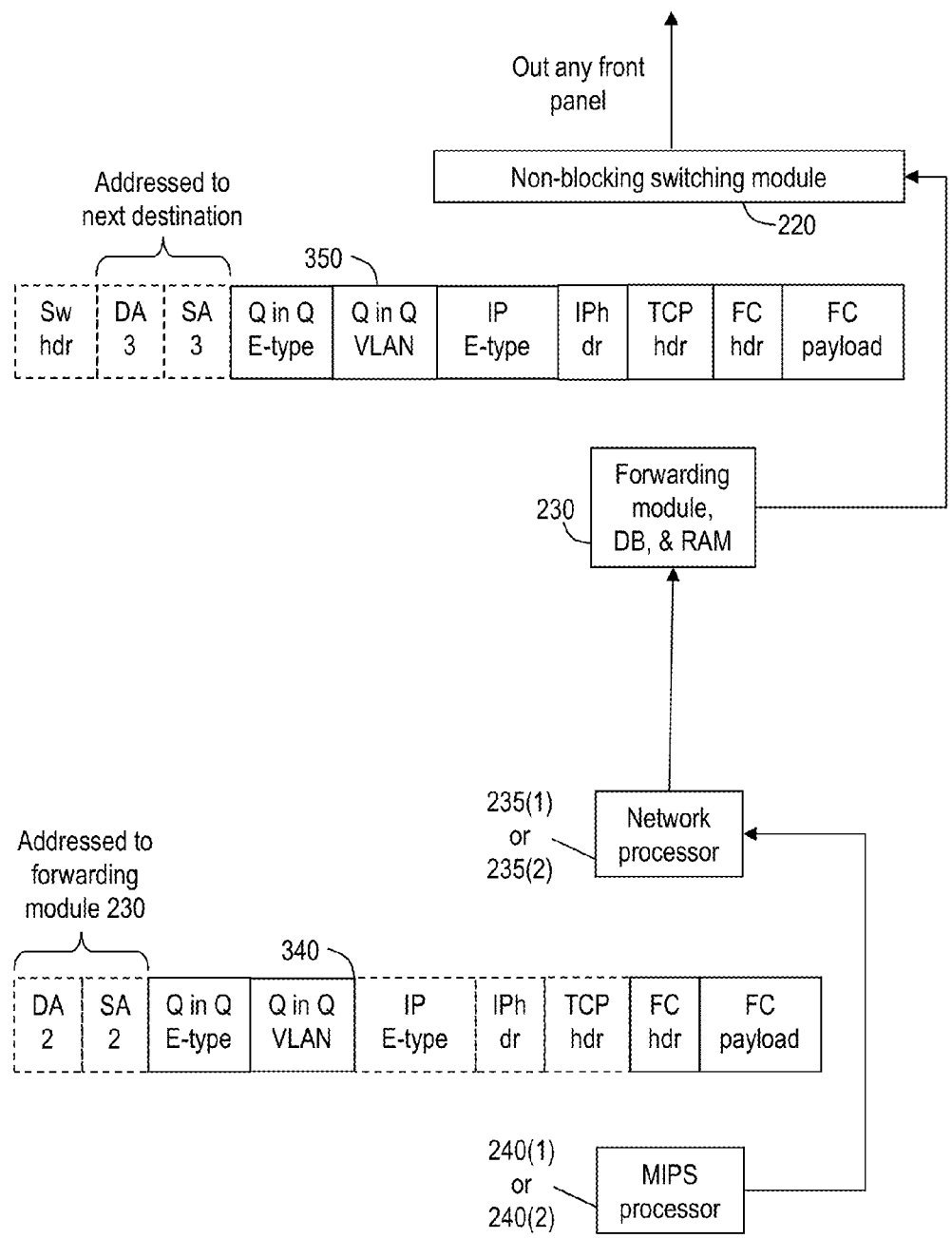

NETWORK APPLIANCE WITH INTEGRATED LOCAL AREA NETWORK AND STORAGE AREA NETWORK EXTENSION SERVICES

CROSS REFERENCE TO RELATED APPLICATION

This application is related to commonly assigned and co-pending U.S. application Ser. No. 13/040,585, filed Mar. 4, 2011, the entirety of which is incorporated herein by reference.

TECHNICAL FIELD

The present disclosure relates to network devices used in Local Area Networks (LANs) and Storage Area Networks (SANs).

BACKGROUND

Data centers may host applications and store large amounts of data for an organization or multiple organizations. Clusters of storage devices, e.g., Fiber Channel (FC) storage arrays, in one location are called SAN islands and communicate using the FC Protocol. Users accessing a SAN may reside on an Ethernet based LAN at another location that may be coupled to an FC server cluster for communication with the FC storage array. To mediate communication between the FC server cluster and the FC storage array, an FC switch network (also called "switched fabric") is employed.

Recent advances have led to virtualization in SANs and LANs resulting in the creation of Virtual SANs (VSANs) and Virtual (VLANs). VSANs and VLANs remove the physical boundaries of networks and allow a more functional approach. In a virtualized environment, virtual devices can move from one place to another without requiring any physical connectivity changes. In addition to virtualization, web hosting, disaster recovery and redundancy considerations make it desirable to extend LANs and SANs beyond traditional single site operations for which LANs and SANs were originally designed.

BRIEF DESCRIPTION OF THE DRAWINGS

FIGS. 3a and 3b depict an example of a packet flow that illustrates the SAN extension functions performed by the device shown in FIG. 2.

DESCRIPTION OF EXAMPLE EMBODIMENTS

Overview

Techniques and a line card apparatus are provided to extend LANs and SANs beyond a data center while converging the associated local area network and storage area network host layers. At a network edge device, a packet is received via a first network interface configured to interface with a local LAN and a local SAN, or a second network interface configured to interface with a remote LAN and a remote SAN, and any intermediate networks. It is determined if the packet is routed to a local SAN or LAN or a remote SAN or LAN based on packet header information. In response to determining that the packet is routed to a remote SAN, SAN extension services are performed with respect to the packet in order to extend the local SAN to the remote SAN and route the packet to the remote SAN. In response to determining that the packet is routed to a remote LAN, LAN extension services are performed with respect to the packet in order to extend the local LAN to the remote LAN and route the packet to the remote LAN. In response to determining that the packet is routed to a local SAN, the packet is routed to the local SAN and in response to determining that the packet is routed to a local LAN traffic, the packet is routed to the local LAN. Otherwise the packet is routed or forwarded according to the packet header information.

Example Embodiments

Figure 1:
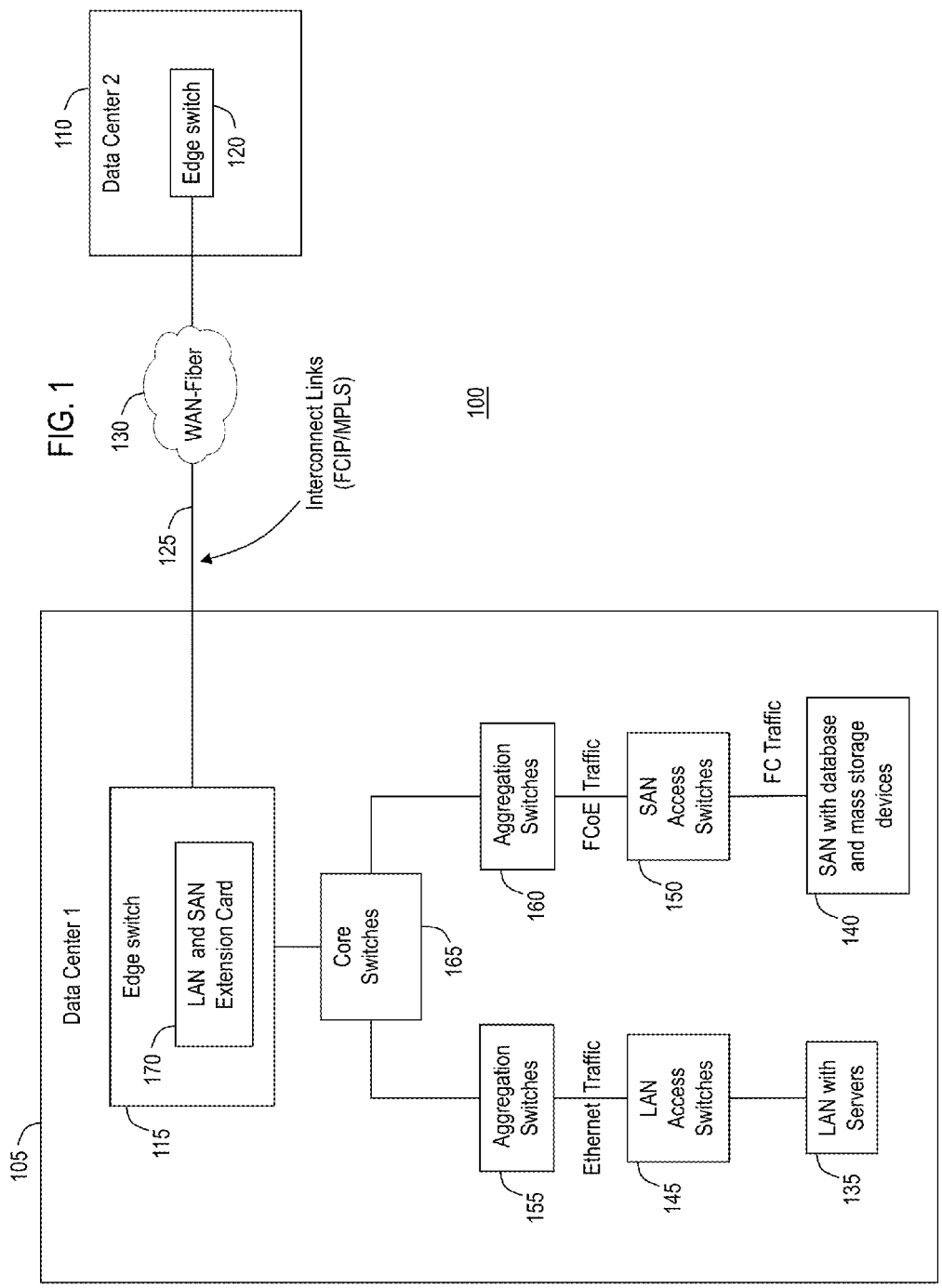
FIG. 1 is an example of a block diagram of a network with two data centers coupled by a Wide Area Network (WAN) with long range fiber optic connections, where an edge switch at one of the data centers with integrated SAN and LAN extension capabilities is deployed.

Referring first to FIG. 1, an example system 100 is shown for a multiple data center environment. System 100 comprises a first data center 105 and a second data center 110. The two data centers 105 and 110 communicate with each other using edge switches 115 and 120, respectively, by way of interconnect links 125. The two data centers 105 and 110 may be physically separated by some distance. In this example, the data centers 105 and 110 are separated by Wide Area Network (WAN) 130 that provides long range communication by optical fiber, e.g., via a Coarse Wavelength Division Multiplexing (CWDM) dark fiber or a Dense Wavelength Division Multiplexing (DWDM) color fiber network. The data centers 105 and 110 may also be part of a campus wide network or Metropolitan Area Network (MAN).

Data center 105 is shown in a simplified form and has a LAN 135 and a SAN 140. The LAN 135 may host application services, e.g., World Wide Web server applications or remotely hosted Virtual Machine (VM) applications, while SAN 140 may host database and mass storage services for access by the LAN applications. LAN access is provided by LAN access switches 145 while SAN access is provided by SAN access switches 150. Ingress or upstream traffic from the LAN and SAN is aggregated by aggregation switches 155, and egress or downstream traffic to the LAN and SAN is distributed by core switches 165 and aggregation switches 165 and aggregation switches 155. Similar functionality is provided for SAN traffic by core switches 165 and aggregation switches 160. A plurality of switches is provided at each access, aggregation, and core level to achieve redundancy within the data center 105. Data center 110 may be similarly configured. As used herein, the term "ingress" generally refers to network traffic exiting the LAN or SAN to the WAN 130, while the term "egress" generally refers to network traffic destined for the LAN or SAN.

Typically, LAN and SAN extension may be achieved at the physical layer (Layer 1 of the Open Systems Interconnect (OSI) model) and the data link layer (Layer 2) by adding and configuring extension hardware, and configuring the various switches. This is a cumbersome process and requires a data center operator to configure four separate layers of switches. For LAN extension, transport virtualization is usually configured at the aggregation switches 155 and provides Internet Protocol (IP) encapsulation of Ethernet traffic for IP tunneling over the WAN 130, e.g., using Multiprotocol Label Switching (MPLS). LAN Layer 3 forwarding is configured at the core switches 165 while data center interconnect (DCI) and Quality of Service (QoS) is provided by edge switch 115.

Entities within a LAN are generally isolated to a local area. Entities within the LAN talk to each other without any provisioning because each entity performs auto learning of the presence and absence of other LAN entities. When entities in different LANs need to talk to each other, they are typically connected by another networking technology, mainly IP routing. IP routing does require some provisioning in the network. Applications like VM mobility or server clustering expect functionalities within a LAN even when the entities are actually spread across multiple LANs. The typical case is when the entities are in isolated LANs but are connected through a WAN, e.g., the Internet, Layer 3 Virtual Private Networks (VPNs), etc.). LAN extension is a technology that allows these isolated LAN entities to talk to each other by treating the underlying network as a single LAN.

SAN extension may provide data and application mobility between data centers, e.g., VM data and application mobility for a particular user, and data replication for data storage at multiple data centers in order to provide backup data sources and data validation. When the WAN, e.g., WAN 130, supports IP traffic, any FC or FCoE frames are encapsulated into FCIP.

SAN extension is typically achieved by adding a SAN extension module to the SAN access switches 150. The SAN extension module encapsulates native FC traffic or FC over Ethernet (FCoE) traffic using the FC over IP (FCIP) protocol for transport over WAN 130. SAN traffic received over WAN 130 is decapsulated into FC or FCoE traffic for the SAN 140. Additional SAN extension services may include input/output data compression and acceleration.

According to the techniques described herein, both LAN and SAN extension services are collapsed into a single switch, appliance, or line card, e.g., LAN and SAN extension card 170 residing in edge switch 115. LAN and SAN extension card 170 simplifies data center operations and reduces data center costs. In addition, LAN and SAN extension is provided up to the application layer (Layer 7), thereby converging OSI host layers. Accordingly, typical Layer 1 through Layer 3 LAN and SAN extension is provided at Layers 4 through 7 according to techniques described herein, i.e., LAN and SAN extension services are converged at the host Layers 4-7.

Figure 2:
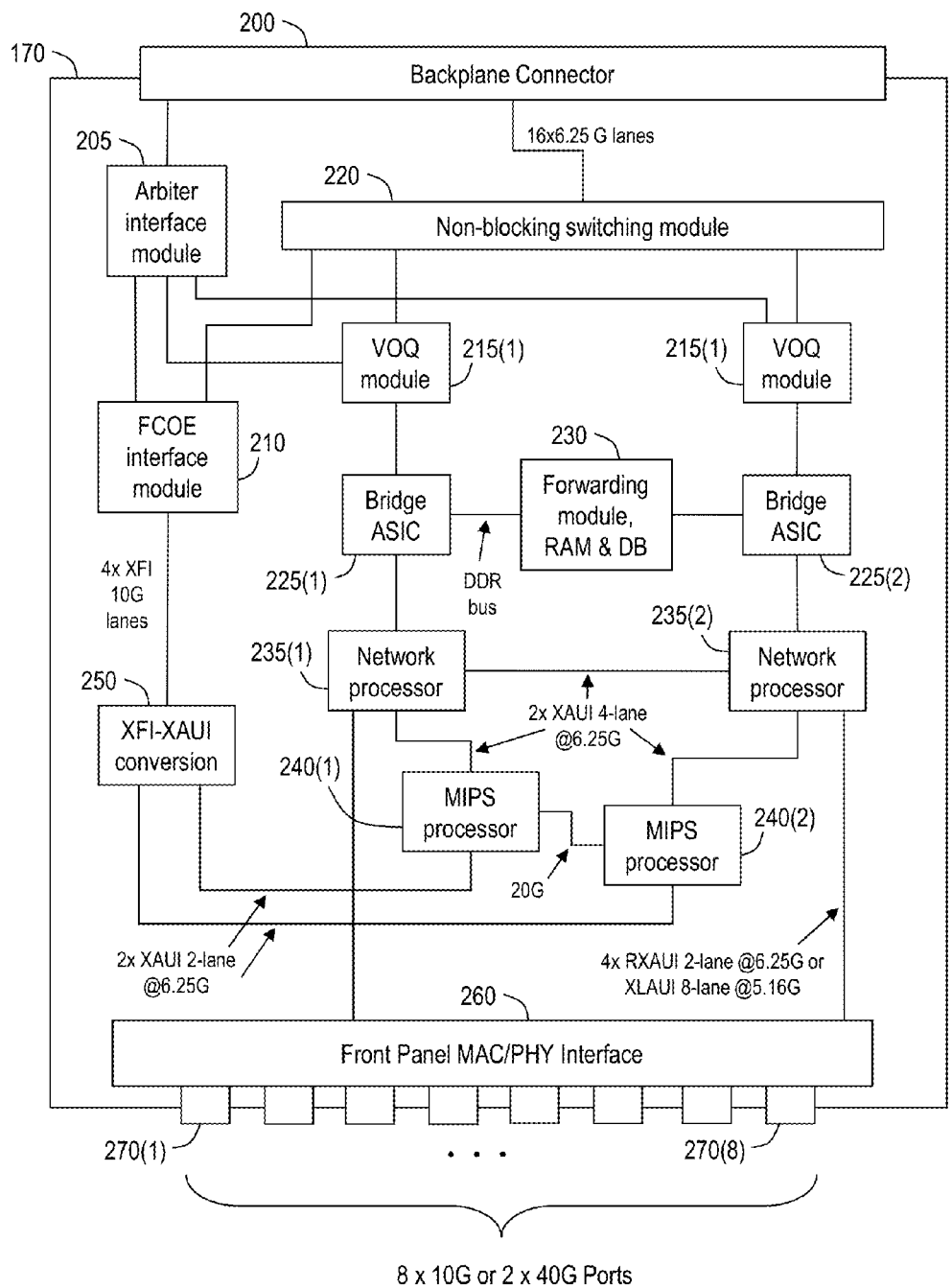
FIG. 2 is an example hardware block diagram of a network device, e.g., a line card, configured to provide both LAN extension and SAN extension beyond a data center.

Turning now to FIG. 2, an example block diagram of a line card is shown, e.g., line card 170, for use in a switch device such as edge switch 115. The line card 170 comprises a backplane connector 200, an arbiter interface module 205, a non-blocking switching module 220, a front panel Media Access Control (MAC) and physical layer (PHY) interface 260 that is coupled to a plurality of ports 270(1)-270(8). Coupled between the switching module 220 and the MAC/PHY interface 260 are a plurality of components that provide LAN and SAN extension services at the data center edge. SAN extension is provided primarily by an FCOE interface module 210, Extended Firmware Interface (XFI)-X Attachment Unit Interface (AUI) conversion unit 250, and MIPS processors 240(1) and 240(2). LAN extension is provided primarily by Virtual Output Queuing (VOQ) modules 215(1) and 215(2), Forwarding module 230, and network processors 235(1) and 235(2). Bridge Application Specific Integrated Circuits (ASICs) 225(1) and 225(2) provide interface conversions between VOQ modules 215 and network processors 240, as well packet header rewrites based on lookups from forwarding module 230. The forwarding module 230 has random access memory (RAM) that stored forwarding information in a database (DB).

The backplane connector 210 is coupled to the backplane of edge switch 115 for sending and receiving traffic SAN and LAN to and from other network devices over WAN 130. The switching module 220 performs the basic switching operations for egress and ingress LAN and SAN traffic, and may be implemented by one or more ASICs. In this example, the front panel of the line card 170 has eight 10 Gigabit (G) ports 270(1)-270(8) for receiving and transmitting Ethernet or optical signals. The front panel may be designed with other configurations, e.g., the front panel could have two 40 G ports that provide the same capacity as eight 10 G ports. In the lower half of FIG. 2 the data links are label with example XFI and AUI lane capacities. The data links in the upper half are more application specific and may be in the form of ASIC-to-ASIC communication that use protocols selected or specified by the manufacturer.

On ingress, the PHY performs optical to electrical signal conversion, if necessary, and supplies electrical signals to the MAC layer. The MAC layer detects incoming packets or frames using start of frame and end of frame delimiters. Before forwarding the frame for further processing, the MAC layer may prepend an internal switch header onto the frame that provides the switching module 220 with details such as ingress port, type of port, ingress VSAN/VLAN, frame QoS markings, and a timestamp indicating when the frame entered the switch. The internal switch header is an architectural element that enables multiprotocol and multitransport capabilities of the line card 170. The MAC layer may also check that the received frame contains no errors by validating its cyclic redundancy check (CRC). On egress through the front panel the MAC layer may provide any formatting necessary, drop outdated frames, and add or remove the appropriate header information. The PHY layer then transmits the frames according to the corresponding port configuration for LAN or SAN traffic. The frames are associated with packets going to and from the LAN or SAN.

The data processors 235 and 240 may be, for example, microprocessors, microcontrollers, or specialized network processors. For example, the MIPS processors 235 may be the Octeon II manufactured by Cavium Networks or the MPC8xxx series manufactured by Freescale Semiconductor, while the network processors may be the NP-4 manufactured by EZchip that has built in Ethernet ports that interface with the MAC/PHY interface 260. The data processing devices 235 and 240 may also be referred to herein simply as a processor and may also be a general purpose processor or controller, or a combination of specialized and general purpose processors.

The memory for forwarding module 230 may be any form of RAM, FLASH memory, disk storage, or other tangible (non-transitory) computer readable media storage device that stores data used for the techniques described herein. The processors 235 and 240 may also have their own memory. Instructions for performing SAN extension features are collectively incorporated into the FCOE interface module 210 and MIPS processors 240, with lane conversion provided by XFI-XAUI conversion unit 250. Instructions for performing LAN extension are collectively incorporated into the VOQ modules 215, forwarding module 230, and network processors 235. The SAN extension process is described herein in connection with FIGS. 3a, 3b, 4a-4e, and 5, while the LAN and SAN extension process is described herein in connection with FIGS. 6a-6i.

The functions of the processors 235 and 240 may be implemented by a processor or computer readable tangible (non-transitory) medium (e.g., a memory device) encoded with instructions or by logic encoded in one or more tangible media, e.g., digital signal processor (DSP) instructions, software that is executed by a processor, etc. Part of the LAN and SAN extension logic may be implemented by ASICs, systems on a chip (SOCs), or other fixed or programmable logic (e.g., software or computer instructions executed by a processor or field programmable gate array (FPGA), wherein the memory 230 or other store medium stores data used for the computations or functions described herein (and/or to store software or processor instructions that are executed to carry out the computations or functions described herein). Thus, functions of the LAN and SAN extension card 170 may be implemented with fixed logic or programmable logic.

The non-blocking switching module 220 may be implemented by an ASIC that has enough connectivity and throughput to be non-blocking, i.e., packets are not delayed by the switching module 220. Switched fabric interfaces from FCOE interface module 210 and VOQ modules 215 are arbitrated by arbiter interface module 205 with a central arbiter on the switch 115. The arbiter interface module 205 may be implemented by an ASIC and supports programmable absolute, interleaved weighted round-robin, and best effort arbitration among class of service (CoS) levels. Request and credit messages are passed from the interfaces through the arbiter interface module 205 to the central arbiter.

VOQ modules 215 may also be implemented via an ASIC. Primary functions include virtual output queuing, unicast-flood packet replication, fabric high availability and local (non-arbitrated traffic) & central (arbitrated traffic only) arbitration support. VOQ modules 215 also support data virtual query interfaces (VQIs). In addition to interface conversions, the bridge ASICs 225 performs Layer-3 multicast packet replication and packet header rewrites based on lookup result from the forwarding module 230. ASICs 225 may also perform FCIP to DCI tunnel mapping in order to send the LAN extension traffic over a WAN link.

The forwarding module 230 may be implemented by a series of ASICs and associated memory for database lookups. Forwarding module 230 mainly provides Layer-2 and Layer-3 forwarding. Locally generated (ingress) LAN traffic is prepared for transport over the WAN 130 using a LAN extension protocol such as Location/Identifier Separation Protocol (LISP) or Overlay Transport Virtualization (OTV). LISP or OTV traffic is typically tunneled using IP version 4 (IPv4), IPv6, or MPLS packets depending on the transport mechanisms available over WAN 130, although other protocols may be used. Thus, the LISP and OTV protocols provide DCI capability by way of WAN 130.

Forwarding module 230 functions include packet header lookups, destination lookup, and encapsulating, decapsulating and rewriting the packet headers. Forwarding module 230 may support the following additional functions: Layer 2 Ethernet switching, IPv4 unicast/multicast forwarding, IPv6 unicast/multicast forwarding, MPLS forwarding for Layer 2 and Layer 3 VPNs, IP based Layer 3 VPNs that include Generic Routing Encapsulation (GRE) tunneling, policy based forwarding, dynamic flow based forwarding, policy based security ACLs, policy based QoS policing and marking, and dynamic flow based QoS policing and marking. The forwarding module 230 provides IPv4, IPv6, or MPLS encapsulation of packet for transport over the WAN 130.

The forwarding module 230 in conjunction with the network processors 235 perform one or more of traffic classification, traffic metering, traffic marking, congestion management, and traffic conditioning functionality in a hierarchical manner for Ethernet encapsulated traffic, e.g., LAN and FCIP traffic. The hierarchy applies different various traffic controls at various traffic levels or layers. For example, several sessions or classes may be attached to a virtual or logical port/interface, and several logical ports may be tied to a physical port. QoS policies may be applied at each of the session or class, logical port, and physical port levels. Thus, forwarding module 230 and network processors 235 facilitate network communications according to a QoS service model, e.g., to provide hierarchical QoS for traffic exchanged over the WAN 130.

On egress, session traffic may be classified according to a CoS which may have assigned bandwidth limits, traffic priority, and traffic shaping attributes that eventually affect how the LAN traffic gets queued for output. At the logical port level, the logical ports may be over subscribed with respect to the physical port, i.e., the sum of the bandwidth assigned to the logical ports exceeds the bandwidth that the physical port can actually transmit. Accordingly, traffic may be back pressured or slowed down at the logical port level according to the QoS policy. For egress traffic, similar types of QoS features may be applied to traffic destined for the LAN. The above description of the hierarchical QoS has been simplified for ease of illustration and is not intended to be limiting.

The MIPS processors 240 provide additional packet processing. The packets may be encrypted, dropped, or sent in the clear. A complete inline IP Security (IPSec) protocol stack is maintained for encrypting both IP packets for LAN extension and FCIP packets for SAN extension. For packet egress to the LAN or SAN, the packets may be decrypted if previously encrypted and sent to the respective LAN or SAN. The MIPS processors 240 facilitate data transfer by providing data compression services in order to accelerate the flow of data. Additional services may include one or more of data replication, disaster recovery, snapshots, e.g., any-point-in-time copies, remote replication I/O Acceleration, data throughput acceleration, data encryption and decryption, and data compression.

The FCOE interface module 210 uses packet inspection to determine IEEE 802.1ad and 802.1q (Q in Q) VLAN and Ethernet type (E-type) field information for ingress traffic, the appropriate SAN source and destination addresses for egress traffic, and performs the corresponding header rewrites.

Figure 3A:
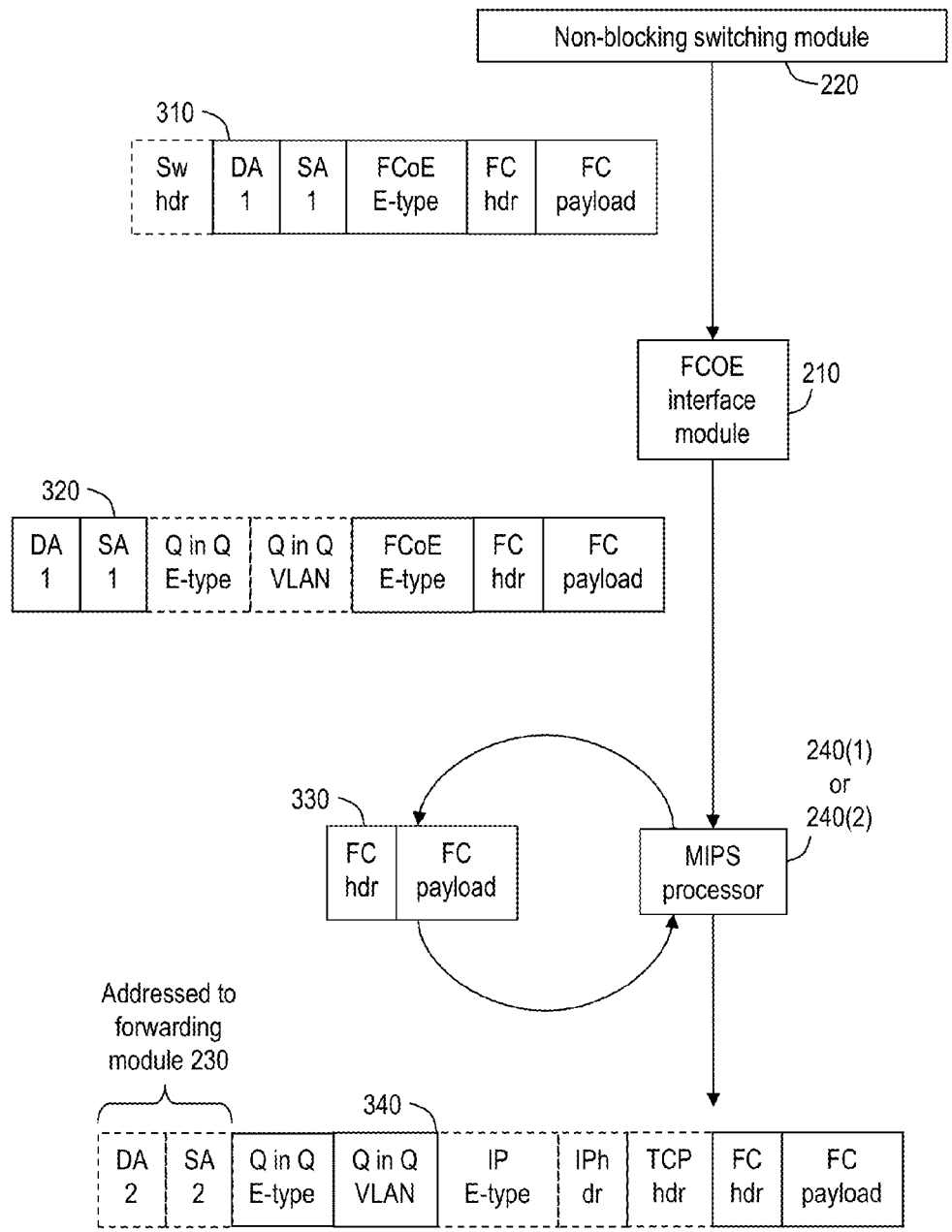

Referring now to FIGS. 3a and 3b, SAN extension functions will be described for an ingress packet. FIG. 3a depicts switch module 220, FCoE interface module 210, and MIPS processor 240(1) or 240(2) from FIG. 2. At 310, an FCoE packet is received via the switch module 220. The pack has a switch header (sw hdr) that is used for transport through edge switch 115 (FIG. 1). In this example, header fields that change between components are indicated by dashed lines. At 320, the FCoE packet has been processed by the FCoE interface module 210. The FCoE interface module 210 strips off the switch header and adds the Q in Q VLAN and E-type fields.

At 330, the MIPS processor 240(1) or 240(2) performs packet inspection on the FC header. At 340, based the FC header information, the MIPS processor 240(1) or 240(2) encapsulated the FCoE packet into an FCIP packet for IP forwarding by adding IP E-type, IP header, Transport Control Protocol (TCP) header to the packet. The MIPS processor 240(1) or 240(2) also rewrites the source address (SA) and destination address (DA) with an address associated with the forwarding module 230.

In FIG. 3b, the switch module 220, forwarding module 230, network processor 235(1) or 235(2), and MIPS processor 240(1) or 240(2) from FIG. 2 is shown. Starting at the bottom of FIG. 3b, packet 340 for FIG. 3a is shown. At 350, the packet has been processed by network processor 235(1) or 235(2), and forwarding module 230. The DA and SA have been rewritten for transport out of any front of any line card in switch 115 for transport over the WAN 130. The reverse process is used for egress traffic destined for a data center SAN.

Figure 4A:
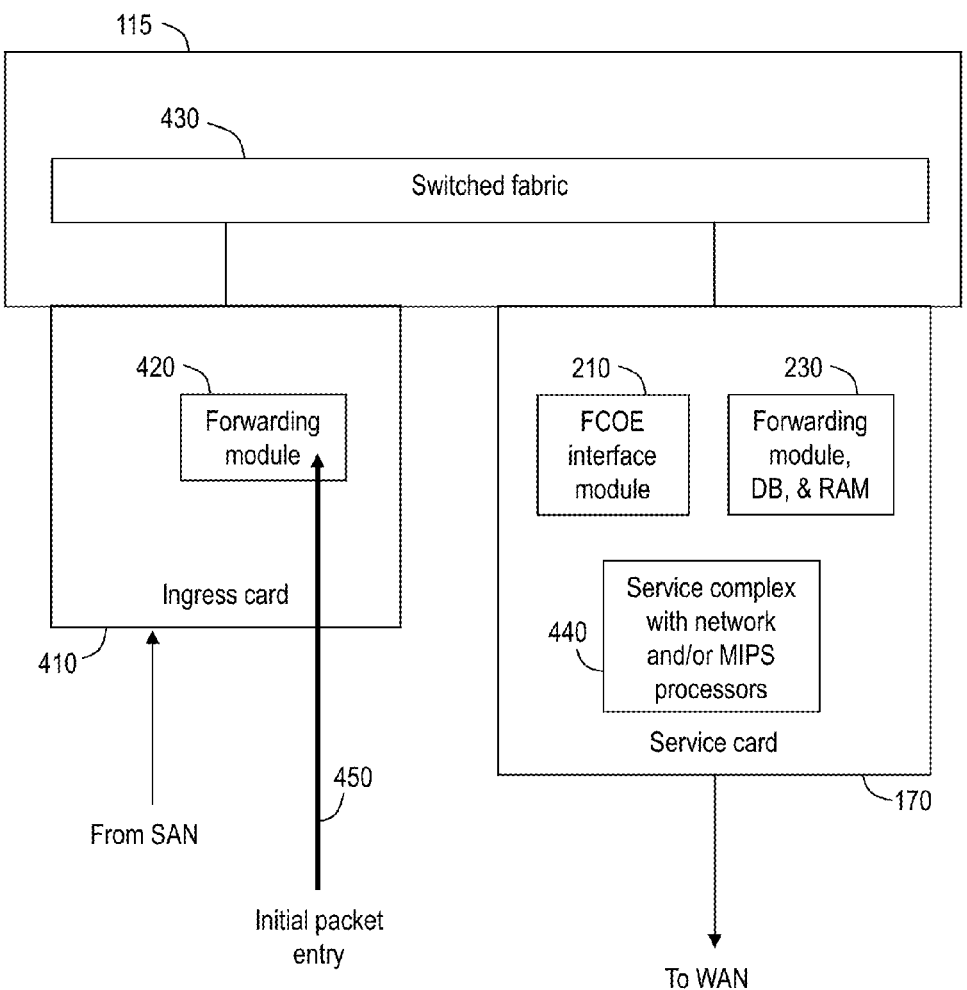
FIGS. 4a-4e illustrate an ingress packet flow from a SAN to a WAN through a data center edge device that incorporates the device shown in FIG. 2.

The SAN extension process is further illustrated in FIGS. 4a-4e, and FIG. 5. Referring first to FIG. 4a, a switched fabric 430 for edge switch 115, an ingress card 410, and LAN and SAN extension card 170 (labeled as a service card) are shown. The ingress card need not be attached to switch 115 but may be any network appliance between edge switch 115 and a SAN. The ingress card 410 has a forwarding engine or module 420. Extension card 170 has a service complex 440 that encompasses processing components, e.g., MIPS processors 240, which are not shown in detail. At 450, a packet is receiver from the SAN. The packet may be a native FC frame or an FCoE packet.

Figure 4B:
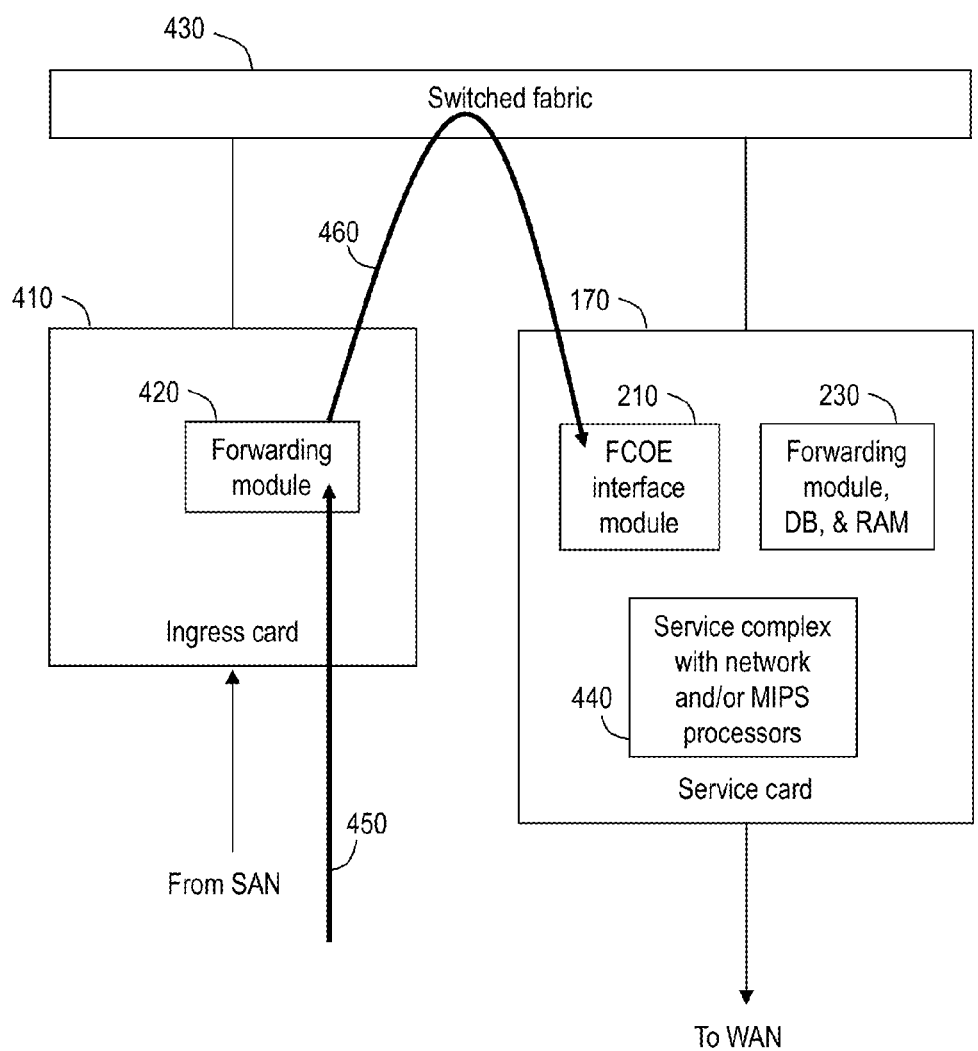
Figure 4C:
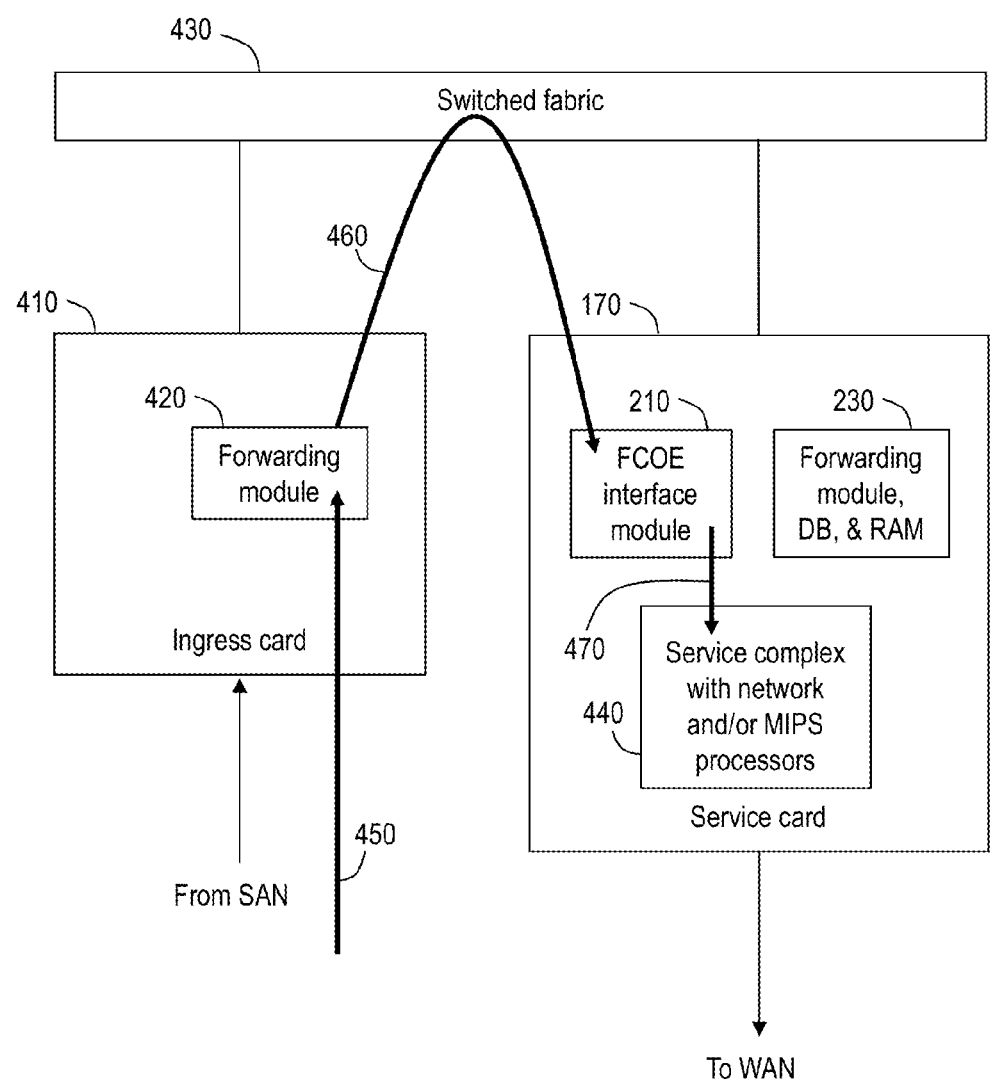
Figure 4D:
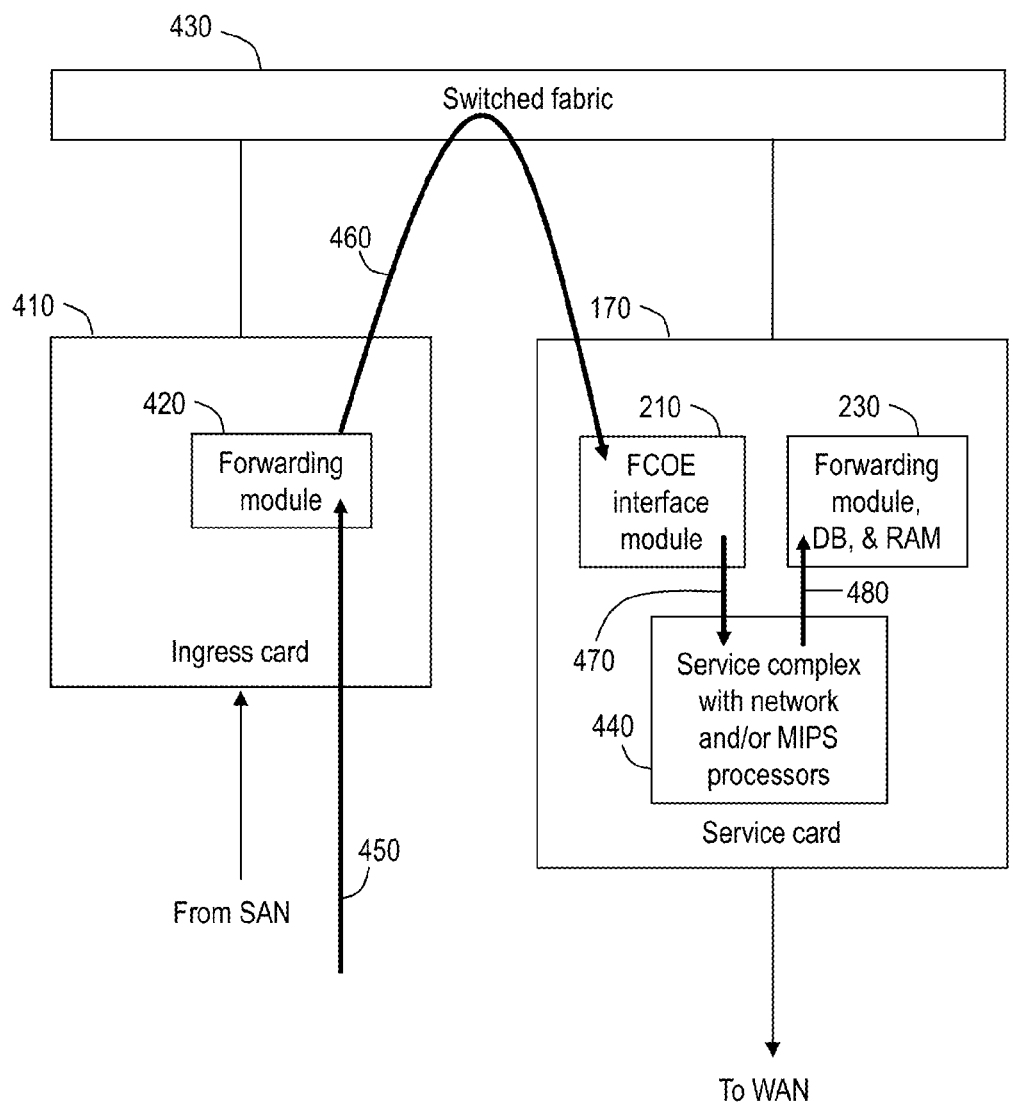

In FIG. 4b, at 460, the forwarding module forwards the packet through the switched fabric 430 to LAN and SAN extension card 170 where it is processed by the FCoE interface module 210. In FIG. 4c, at 470, the FCoE interface module 210 processes the packet as describe in connection with FIG. 3a and forwards the packet to the service complex 440. In FIG. 4d, at 480, the service complex 440 encapsulates the packet and forwards the packet to the forwarding module 230.

The forwarding module 230 determines which output port on the edge switch, e.g., edge switch 115 from FIG. 1, over which the ingress packet is to be sent. When a packet is received by the forwarding module 230, multiple simultaneous lookups may be initiated. First, a per-VSAN forwarding table lookup is performed based on an associated VSAN and a destination address. The result from the first lookup informs the forwarding module 230 of the forwarding port based on the receiving port, associated VSAN, and destination address within the FC frame. The first lookup also indicates whether there is a requirement for any Inter-VSAN Routing (IVR). If the lookup fails, the frame is dropped due to a lack of a forwarding destination.

The second lookup is a statistics based lookup. The switch uses the second lookup (and associated database updates) to maintain a series of statistics about endpoint device and inter-device communication. The statistics that are maintained may include packet and byte counters from a given source to a given destination. The third lookup is a per-VSAN ingress Access Control List (ACL) lookup by VSAN, source address, destination address, ingress port, and a variety of other data fields from an inter-switch header and corresponding FC frame header. The switch uses the result from the third lookup to either permit the frame to be forwarded, drop the frame, or perform any additional inspection on the frame, e.g., to enforce access to hard FC zones that are implemented to logically group SAN components.

If the packet has multiple possible forwarding ports, for example, if there are multiple equal-cost Fabric Shortest Path First (FSPF) routes or the destination is a port channel bundle, a load-balancing decision is made to choose a single physical egress interface from a set of interfaces. The load-balancing policy (and algorithm) can be configured on a per-VSAN basis to be either a hash of the source and destination addresses (SA_ID, DA_ID) or a hash also based on the Originator Exchange Identifier (OX_ID) of the frame. In this manner, all frames within the same flow (either between a single source to a single destination or within a single Small Computer System Interface (SCSI) I/O operation) will always be forwarded on the same physical path, guaranteeing in-order delivery. If traffic from a given source address to a given destination address is marked for IVR, then the final forwarding step is to rewrite the VSAN ID and optionally the source and destination addresses of the frame.

Figure 4E:
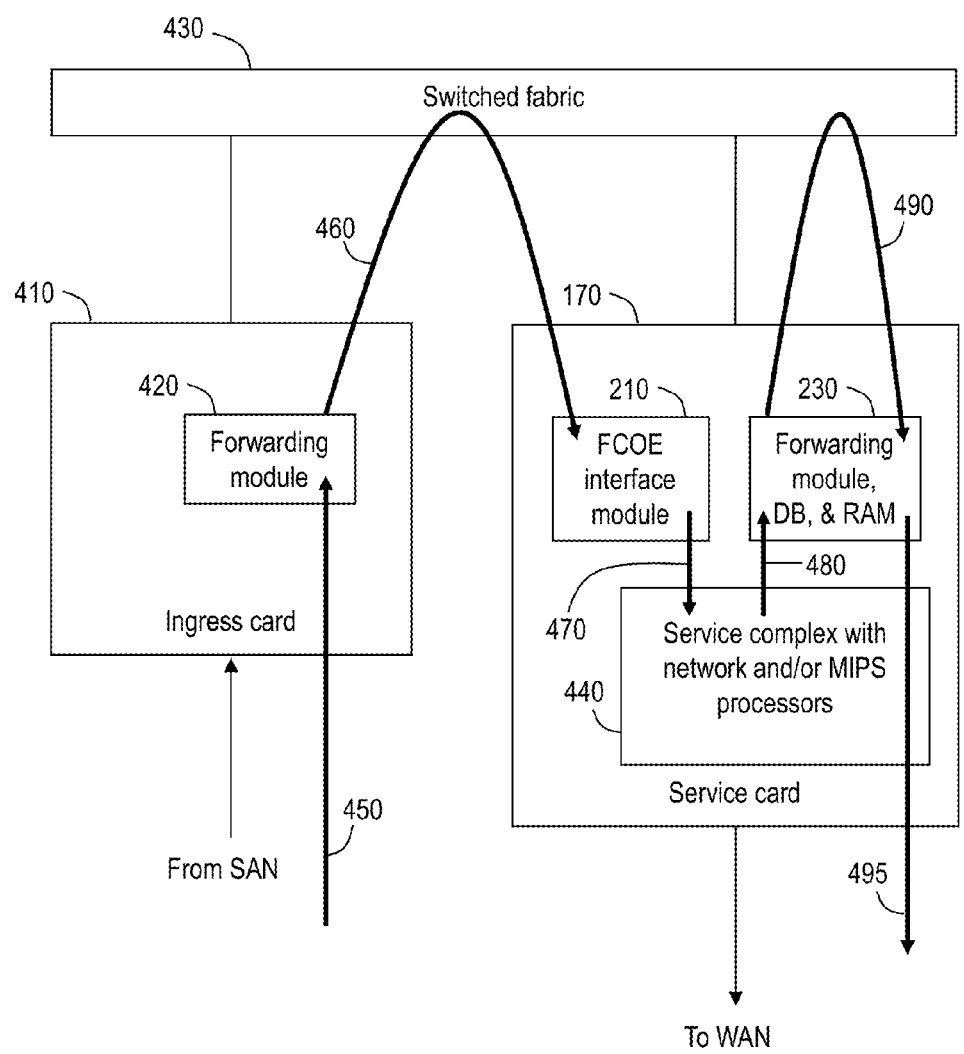

Turning the FIG. 4e, at 490, the forwarding module 230 forwards the packet to the destination. In this example, the packet routing comes back into the extension card 490. At 495, the packet is forwarded to the WAN, e.g., WAN 130 (FIG. 1).

Figure 5:
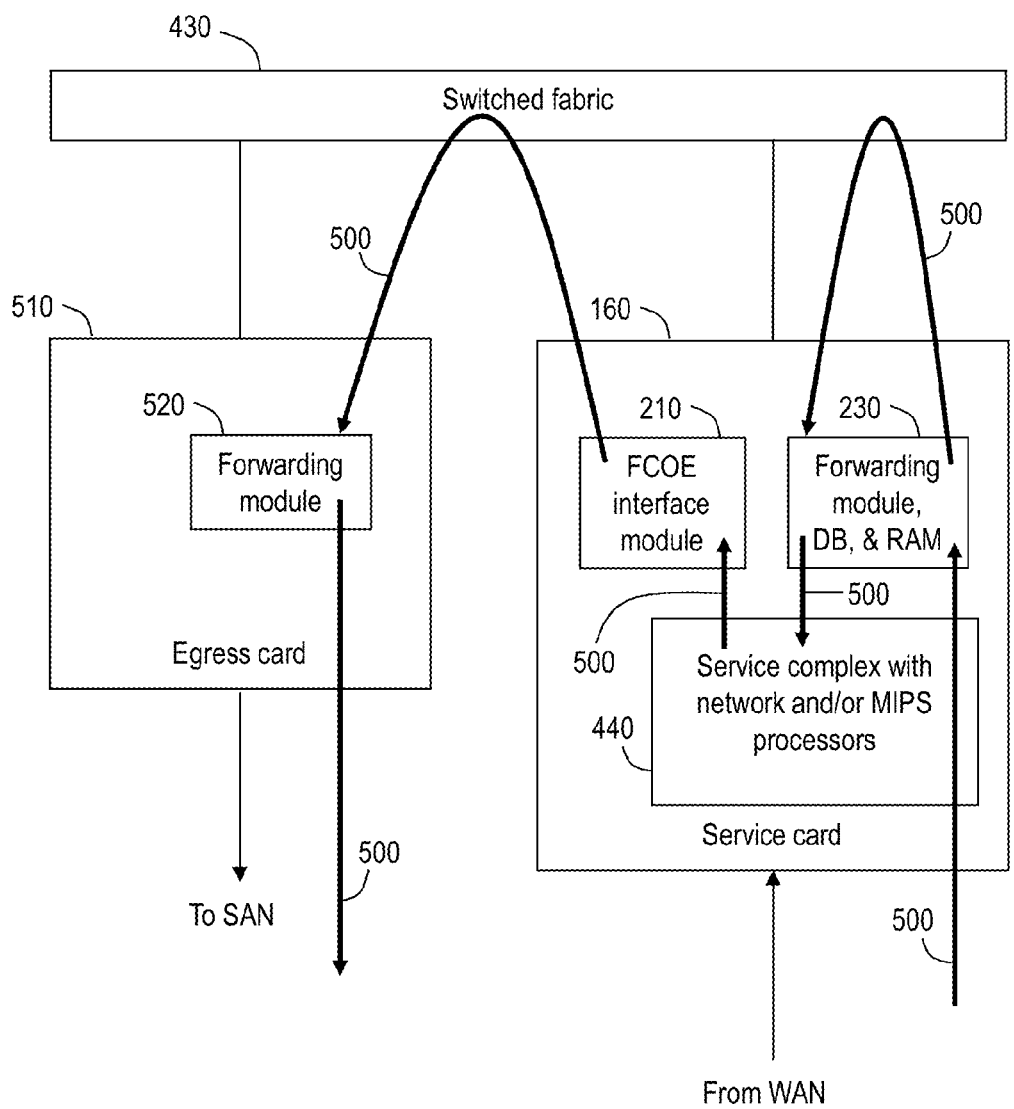
FIG. 5 illustrates an egress packet flow from a WAN to a SAN through the data center edge device that incorporates the device shown in FIG. 2.

Referring to FIG. 5, packet processing for egress traffic is shown. At 500, the packet pathway from the WAN to the SAN is reversed. On egress to the SAN, the forwarding module 230 has signaled that there is output buffer space available for receiving frames, e.g., frames received over the WAN 130. When a frame arrives at the service complex 440, e.g., from the switching module 220 (FIG. 2), one of the first processing steps is to validate that the packet is error free and has a valid CRC. If the packet is valid, the forwarding module 230 will issue an ACL table lookup to see if the frame should be permitted or denied access to its destination. ACL rules applied on egress may include, among other items, Logical Unit Number (LUN) zoning and read-only zoning ACL rules. The next processing step is to finalize any FC frame header rewrites associated with IVR or FC network address translation (NAT). Finally, the frame is queued for transmission to the destination port MAC with queuing on a Class of Service (CoS) basis, e.g., the frame may be matched to an egress queue based on deficit-weighted round robin (DWRR) queuing and configured QoS policy map.

Referring now to FIGS. 6a, 6b, 6c, 6d, and 6e, an example of a flowchart is shown that generally depicts a LAN and SAN extension process for ingress and egress packet flows. The LAN and SAN extension process is identified at reference numeral 600, and will be referred to hereinafter as LAN and SAN extension process 600 or simply as process 600. Although LAN and SAN extension process 600 is described as a process, the various features may be implemented as hardware logic or software that implements a process or parts thereof.

LAN and SAN extension process 600 begins at 604, where at a network edge device, a packet is received via a first network interface configured to interface with a local local area network (LAN) and a local storage area network (SAN), or a second network interface configured to interface with a remote LAN and a remote SAN, and any intermediate networks. The packet may be part of service flow in the form of digital data. The local LAN may be referred to or considered a first LAN and similarly the local SAN may be referred to or considered a first SAN. Similarly, the remote LAN may be considered a second LAN and the remote SAN may be considered a second SAN. The network edge device may be a line card or a single network appliance, e.g., a switch or a router, which is configured to implement LAN and SAN extension process 600 as part of a single unit. At 608, the packet is analyzed to determine if the packet is routed to a local SAN or LAN, or a remote SAN or LAN based on packet header information. Local SANs and LANs are SANs and LANs that may be in the host data center, e.g., data center 105 (FIG. 1), while remote SANs and LANs may be associated with a remote data center, e.g., data center 110. At 612, in response to determining that the packet is routed to a remote SAN, performing SAN extension services with respect to the packet in order to extend the local SAN to the remote SAN and routing the packet to the remote SAN. At 616, in response to determining that the packet is routed to a remote LAN, performing LAN extension services with respect to the packet in order to extend the local LAN to the remote LAN, and routing the packet to the remote LAN.

At 620, in response to determining that the packet is routed to a local SAN, routing the packet to the local SAN. At 624, in response to determining that the packet is routed to a local LAN, routing the packet to the local LAN. Otherwise the packet is routed or forwarded according to the packet header information. The LAN and SAN extension services may be performed by the LAN and SAN extension card 170. Both SAN and LAN packets may be classified according to a predefined policy, e.g., based on SA, DA, or protocol. As an example for a TCP flow with the following 5-tuple information: SrcIP, DestIP, Src Port, TCP port, TCP protocol, data in the TCP flow is classified or mapped based on the 5-tuple. The TCP flow may be mapped to external WAN links using a process referred to as WAN link mapping. Based on the frame classification, the packet is dropped, encrypted, or forwarded in the clear.

Additional details for ingress SAN traffic, ingress LAN, egress SAN traffic, and egress LAN traffic are described in connection with FIGS. 6b, 6c, 6d, and 6e, respectively. The flowchart shown in FIG. 6b continues from FIG. 6a for ingress SAN traffic. At 628, one or more of a VLAN ID and VLAN Ethernet type header information is inserted into the packet. VLAN Ethernet type header information may include an IEEE 802.1ad or IEEE 802.1q Ethernet type identifier. At 632, one or more of IP header, IP Ethernet type, and Transport Control Protocol (TCP) header information is inserted into the packet. At 636, a destination address lookup is performed, and at 640, destination address information within the packet is overwritten based on the destination address lookup. At 644, the packet is forwarded to the remote SAN.

Additional SAN extension services may include data and application replication and mobility services for data and applications associated with the packet. In addition, data compression and acceleration services may be provided. Additional services may be performed that include one or more of performing disaster recovery, data throughput acceleration, data encryption and decryption, and data compression services for data and applications associated services with the packet. The packet is encapsulated using transport protocol, e.g., FCIP when the packet is to be forwarded over an IP network. Other example transport protocols include Internet Small Computer System Interface (iSCSI) and Internet Fiber Channel Protocol (iFCP).

At the destination SCSI and FCP termination services are provided. FCP allows SCSI packets to be encapsulated in FC packets. Whenever a SCSI destination, e.g., known as SCSI target, is reached, the receiver processes the FCP packet and processes the SCSI payload data. These tasks may be performed by line card 170 using, e.g., MIPS processors 240(1) and 240(2).

Figure 6A:
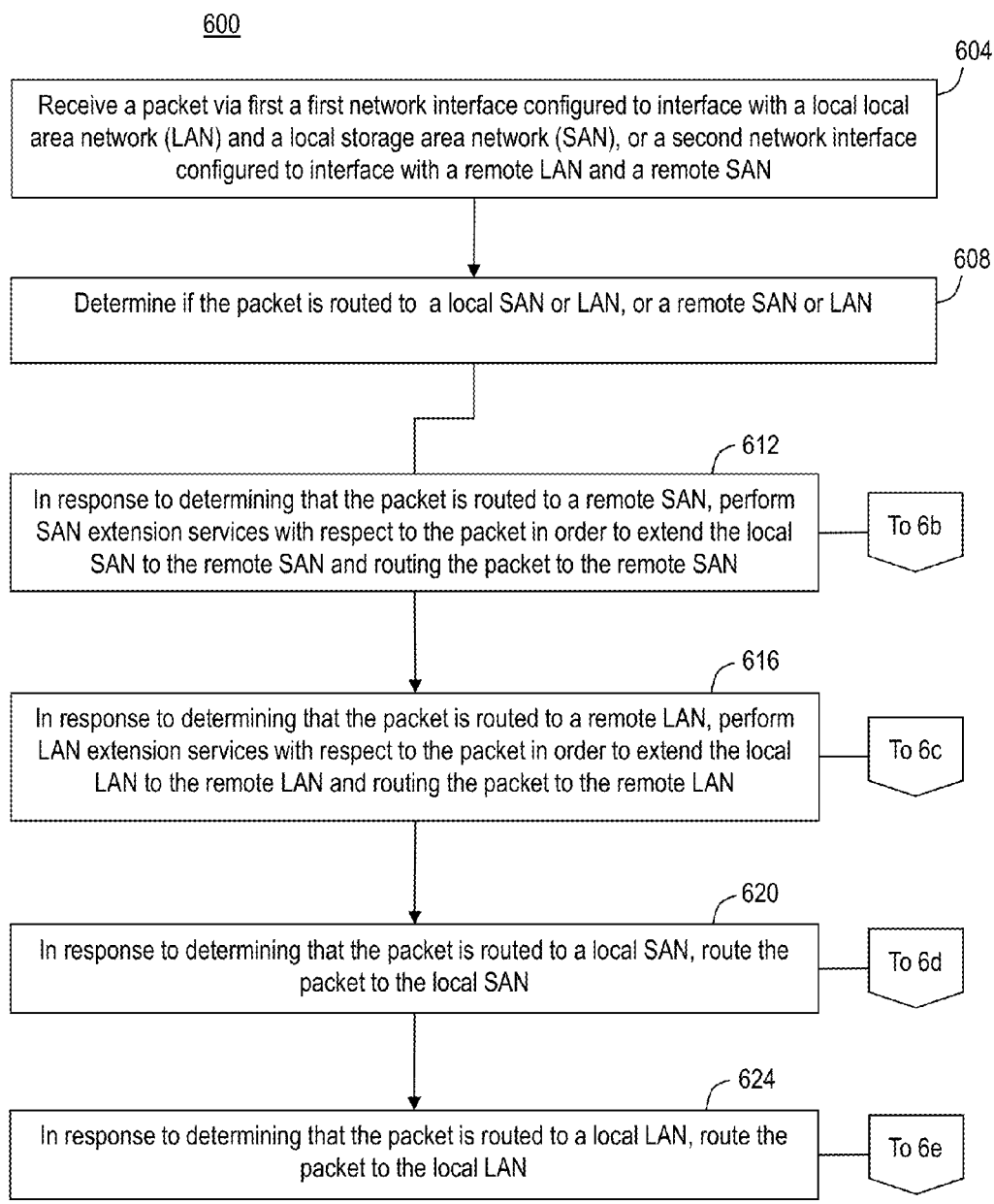
FIGS. 6a-6e depict a flowchart of a process for providing both LAN extension and SAN extension for a packet.
Figure 6B:
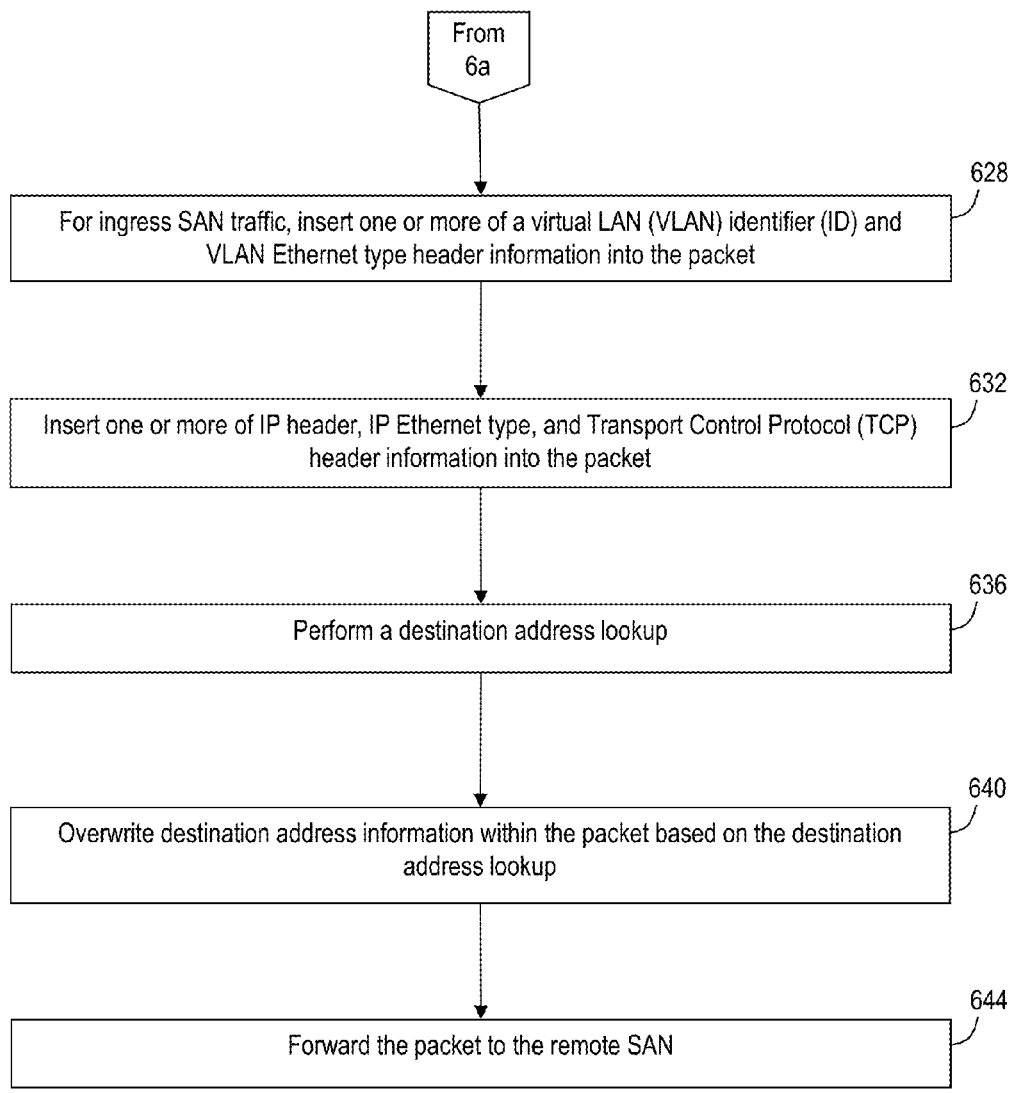
Figure 6C:
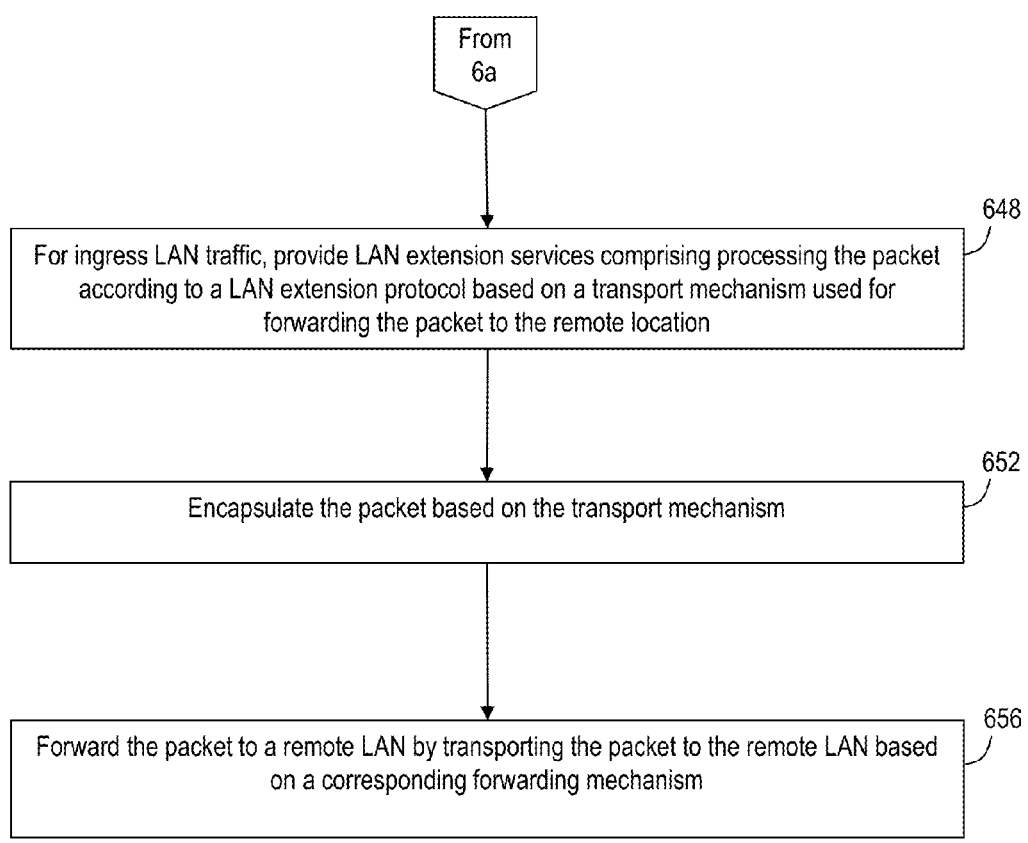

Referring to FIG. 6c, the process continues from FIG. 6a for ingress LAN traffic. At 648, for ingress LAN traffic, LAN extension services are provided that extend the LAN, e.g., that extend local data center LAN communication to a remote data center. The LAN extension services may comprise processing the packet according to a LAN extension protocol based on a transport mechanism used for forwarding the packet to the remote location. At 652, the packet is encapsulated into packets, e.g., IP or MPLS packets, based on the transport mechanism. At 656, the packet is forwarded to the remote location by transporting the IP or MPLS packets to the remote location based on a corresponding forwarding mechanism.

LAN extension services may include QoS processing. A multi-level traffic management framework is provided that comprises one or more of a physical level, a logical level, and a class level, i.e., a form of Hierarchical QoS (H-QoS). Traffic management functions are performed for the packet at each level comprising one or more of QoS classification, traffic metering, traffic marking, congestion management, and traffic conditioning.

H-QoS generally refers to the action of implementing granular QoS policies in a hierarchical manner. The QoS results of one layer in the hierarchy are passed on to the next QoS layer. The processing typically starts from the root of the hierarchy and is propagated to all nodes to achieve the final end result. H-QoS allows a user to create virtual layers in QoS processing to utilize the network resources in a more granular fashion. As an example, if there are N subscribers attached to a physical network port and each subscribing to three classes of service, e.g., television, Internet, and IP-phone, an H-QoS policy allows the user to partition his physical interface into N logical interfaces with three classes of service. Then the user is allowed to configure certain QoS criteria based on subscriber and then based on class of service. For example subscriber A is preferred over subscriber B. However, since IP-phone service is preferred over any other service, B's IP-phone service may be granted higher QoS than A's Internet service.

Figure 6D:
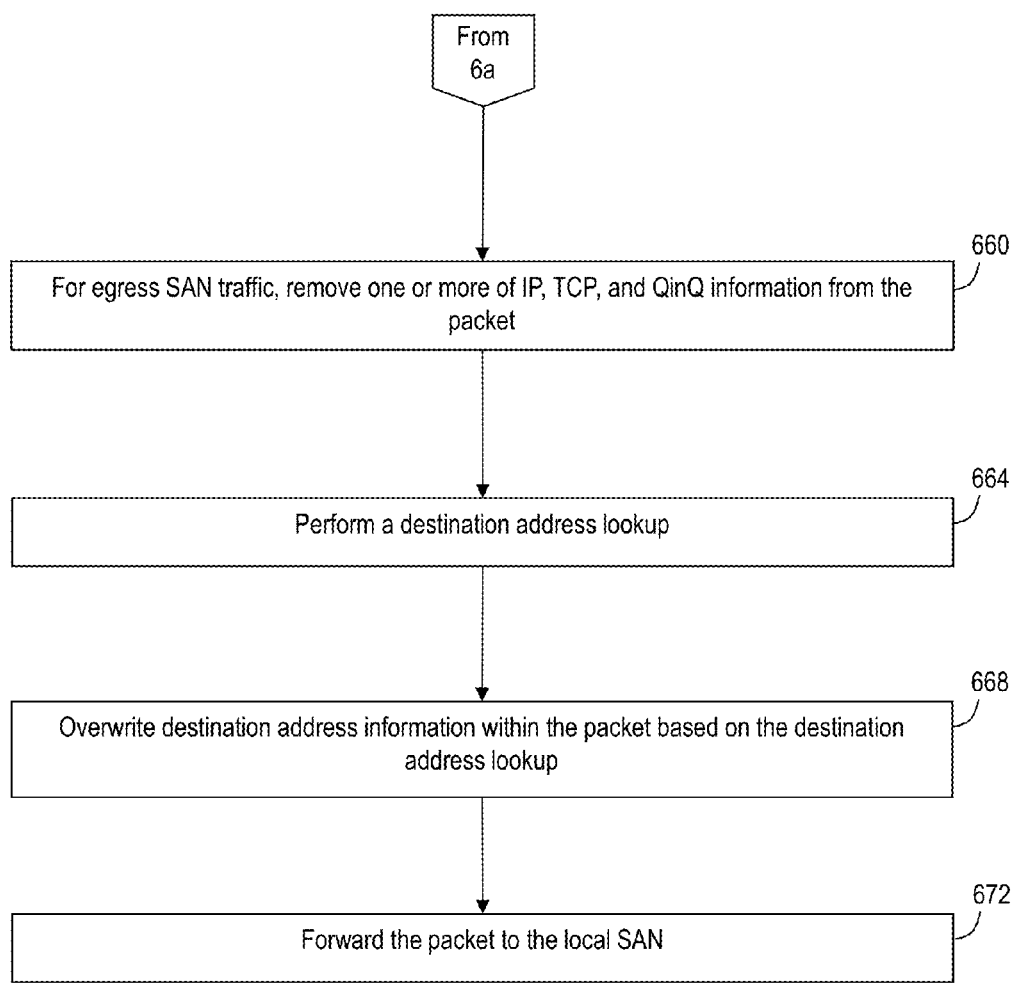

Referring to FIG. 6d, the process continues from FIG. 6a for egress SAN traffic. At 660, for egress SAN traffic, routing and forwarding information is removed from the packet, e.g., IP, TCP, and Q in Q information. At 664, a destination address lookup is performed, and at 668, destination address information within the packet is overwritten based on the destination address lookup. At 672, the packet is forwarded to the local SAN.

Additional SAN extension services may include data and application replication and mobility services performed for data and applications associated with the packet. Disaster recovery, data decryption, or data decompression services may also be performed for data and applications associated services with the packet. For disaster recovery and remote replication services, a copy of the data in transit is sent to another device as a back up for the primary service. These services may be provided by a data tapping mechanism, e.g., using Cisco's SANtap technology, by way of MIPs processors 240(1) and 240(2).

Figure 6E:
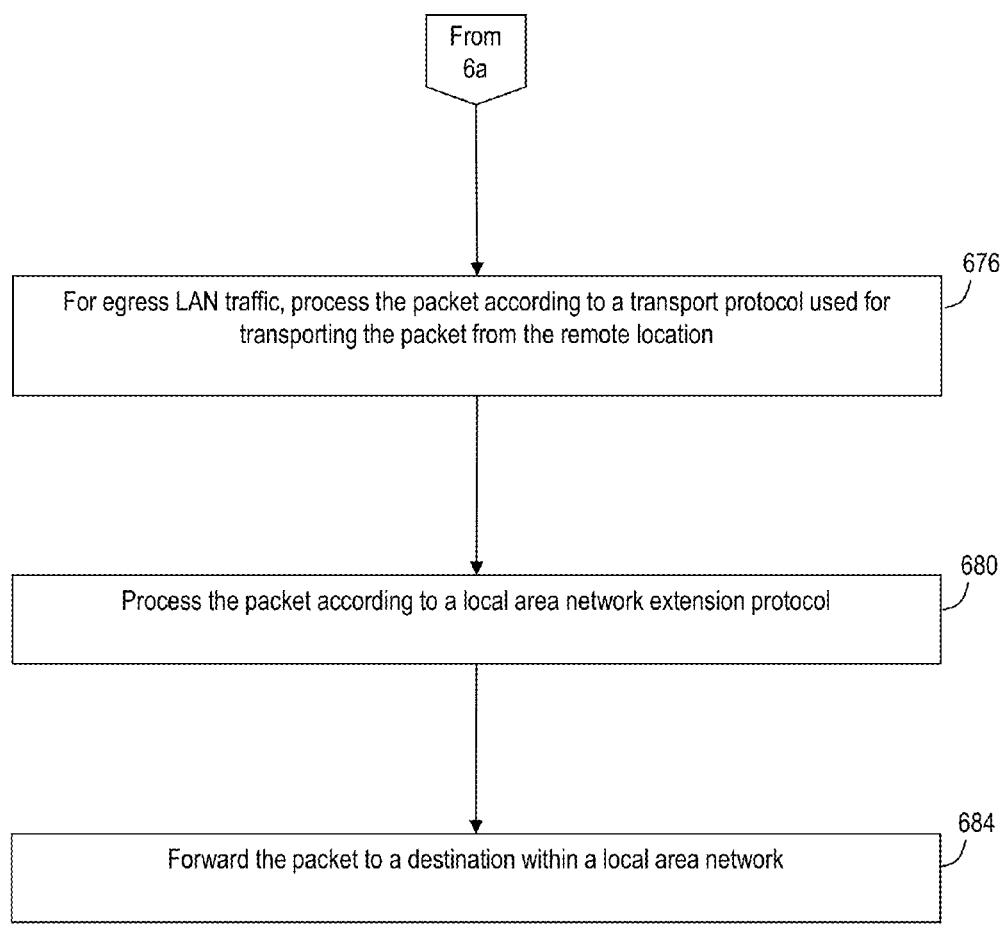

Referring to FIG. 6e, the process 600 continues from FIG. 6a with respect to egress LAN traffic received from the remote location. At 676, the packet is processed according to a transport protocol used for transporting the packet from the remote location. At 680, the packet is processed according to a local area network extension protocol and, at 684, the packet is forwarded to a destination within a local area network.

According to the techniques provided herein, a network appliance, e.g., line card 170, may perform SAN extension services including FCoE forwarding, FC mapping, SCSI/FCP termination, SANTap (Disaster Recovery), FCIP forwarding, IO Acceleration, and Data Compression; and LAN extension service including Q in Q, L3 forwarding, ACL, OTV/MPLS/VPLS/LISP processing, HQoS, Encryption, and WAN link mapping. The above-described services provide N stages of extension services, not to be limited by the examples herein. Traffic is mapped from one stage of processing to the next. For example, a traffic task progresses from one stage (n) to a next stage (n+1).

Control software for the network appliance creates and maintains a services mapping for services provided by the network appliance for any particular traffic type or based on packet header information. During data path processing the mapping transformation for each stage is provided for each packet based on each packet header. A similar process occurs on a reverse traffic pathway. The data path can skip any stage n, and perform packet header transformation between stage (n−1) and stage (n+1). Thus, there are $2^n$ possible service combinations. Any of the service stages may be skipped, or otherwise programmed or not into the network appliance.

In sum, techniques are provided herein for receiving a packet at a device in a network. It is determined if the packet is associated with storage area network traffic or with local area network traffic. In response to determining that the packet is storage area network traffic, storage area network extension services are performed with respect to the packet in order to extend the storage area network on behalf of a remote location. In response to determining that the packet is local area network traffic, local area network extension services are performed with respect to the packet in order to extend the local area network on behalf of the remote location. The packets may flow to and from the associated LAN or SAN.

In addition, an apparatus is provided comprising a network interface configured to receive a packet, and a processor. The processor is configured to: determine if the packet is associated with storage area network traffic or local area network traffic; in response to determining that the packet is storage area network traffic, perform storage area network extension services with respect to the packet in order to extend the storage area network on behalf of a remote location; and in response to determining that the packet is local area network traffic, perform local area network extension services with respect to the packet in order to extend the local area network on behalf of the remote location.

Moreover, one or more computer readable storage media encoded with software comprising computer executable instructions and when the software is executed operable to perform the techniques described herein.

The techniques described herein vastly reduce the operational steps required to manage a data center when integrating SAN and LAN extension services, i.e., data center management for SAN and LAN extension services is collapsed to the WAN edge device. In addition, a high availability (HA) solution or redundancy is achieved with two LAN/SAN extension line cards instead of the four that would normally be required, i.e., separate redundant line cards would each normally be required for LAN extension and SAN extension.

The above description is intended by way of example only.

What is claimed is:

1. An apparatus comprising a line card within a switch device, the line card comprising:
   a first network interface configured to interface with a local local area network (LAN) and a local storage area network (SAN);
   a second network interface configured to interface with a remote LAN and a remote SAN, and any intermediate networks, wherein the second network interface comprises a plurality of Ethernet interfaces configured to connect the local SAN and the local LAN to an intermediate network that provides connectivity to the remote SAN and the remote LAN; and
   a plurality of processors comprising a network processor configured to interface with the plurality of Ethernet interfaces, a forwarding processor configured to rewrite forwarding addresses, an Internet Protocol (IP) interface processor configure to provide an IP-to-fiber channel over Ethernet (FCOE) conversion interface, a virtual output queuing (VOQ) application specific integrated circuit (ASIC) configured to provide LAN extension services and VOQ functions for ingress and egress LAN and SAN traffic traversing the first network interface, and an arbiter interface module configured to arbitrate traffic for the VOQ ASIC, and a FCOE interface processor configured to provide SAN extension services for the ingress and egress LAN and SAN traffic traversing the first network interface;
   wherein the plurality of processors is configured to:
      maintain a services mapping of a plurality of transformations for transmission of a received packet to the remote LAN and a plurality of transformations for transmission of the received packet to the remote SAN;
      receive a packet via at least one of the first or second network interfaces;
      determine if the packet is routed to the local SAN or the local LAN, or the remote LAN or the remote SAN based on packet header information;
      arbitrate the traffic for the FCOE interface processor and the VOQ ASIC;
      in response to determining that the packet is routed to the remote SAN, perform SAN extension services with respect to the packet in order to extend the local SAN to the remote SAN and route the packet to the remote SAN according to the services mapping;
      in response to determining that the packet is routed to the remote LAN, perform LAN extension services with respect to the packet in order to extend the local LAN to the remote LAN and route the packet to the remote LAN according to the services mapping;
      in response to determining that the packet is routed to the local SAN, route the packet to the local SAN;
      in response to determining that the packet is routed to the local LAN, route the packet to the local LAN; and
      otherwise forward or route the packet based on the packet header information.

2. The apparatus of claim 1, wherein the FCOE interface processor is configured to:
   insert one or more of a virtual LAN (VLAN) identifier (ID) and VLAN Ethernet type header information into the packet; and
   forward the packet.

3. The apparatus of claim 2, wherein the IP interface processor is configured to:
   receive the forwarded packet from the FCOE interface processor;
   insert one or more of IP header, IP Ethernet type, and Transport Control Protocol (TCP) header information into the packet;
   overwrite destination address information within the packet for forwarding the packet to a forwarding module; and
   forward the packet to the forwarding module.

4. The apparatus of claim 3, wherein the forwarding processor comprises the forwarding module for processing ingress SAN traffic and is configured to:
   receive the forwarded packet from the IP interface processor;
   perform a destination address lookup;
   overwrite destination address information within the packet based on the destination address lookup; and
   forward the packet to the remote SAN.

5. The apparatus of claim 1, wherein in performing SAN extension services for the local SAN, the plurality of processors is further and configured to:
perform one or more of data and application replication and mobility services for data and applications associated with the packet, disaster recovery, data throughput acceleration, data encryption, and data compression services for data and applications associated services with the packet; and
encapsulate the packet for transport to the remote SAN.

6. The apparatus of claim 1, wherein in performing SAN extension services for the remote SAN, the plurality of processors is further configured to perform one or more of data and application replication and mobility services for data and applications associated with the packet, disaster recovery, data throughput acceleration, data encryption, and data compression services for data and applications associated services with the packet.

7. The apparatus of claim 1, wherein the forwarding processor comprises a forwarding module for processing egress SAN traffic and configured to:
receive the forwarded packet from the remote SAN;
perform a destination address lookup;
overwrite destination address information within the packet; and
forward the packet to an IP interface processor.

8. The apparatus of claim 7, wherein the IP interface processor is configured to:
receive the forwarded packet from the forwarding module;
remove IP information from the packet;
overwrite destination address information within the packet for forwarding the packet to the FCOE interface processor; and
forward the packet to the FCOE interface processor.

9. The apparatus of claim 8, wherein the FCOE interface processor is configured to:
overwrite destination address information within the packet in order to forward the packet to the local SAN; and
forward the packet to the local SAN.

10. The apparatus of claim 1, further comprising a bridge application specific integrated circuit (ASIC) configured to provide an interface between the forwarding processor and the network processor, and configured to perform address rewrites based on address lookups by the forwarding processor.

11. The apparatus of claim 1, wherein the plurality of processors further comprises a switching module configured to provide packet switching between the FCOE interface processor and the forwarding processor.

12. The apparatus of claim 1, wherein in performing SAN extension services and LAN extension services, the plurality of processors is configured to perform one or more of Fiber Channel over Ethernet forwarding, Fiber Channel mapping, Small Computer System Interface/Fiber Channel Protocol termination, SANTap Disaster Recovery, Fiber Channel over Internet Protocol forwarding, IO Acceleration, and Data Compression, Q in Q, Layer-3 forwarding, Access Control List processing, Overlay Transport Virtualization/Multiprotocol Label Switching/Virtual Private LAN Services/Location-Identifier Separation Protocol processing, HQoS, Encryption, and WAN link mapping.

13. A system comprising:
a network switch having one or more backplanes;
a first line card of the network switch coupled to a backplane of the network switch and a local local area network (LAN);
a second line card of the network switch coupled to a backplane of the network switch and a local storage area network (SAN); and
a LAN and SAN extension line card of the network switch comprising:
a first network interface configured to interface with the first and second line cards;
a second network interface configured to interface with a remote LAN and a remote SAN and comprising a plurality of Ethernet interfaces configured to connect the local SAN and the local LAN to an intermediate network that provides connectivity to the remote SAN and the remote LAN; and
a plurality of processors comprising a network processor configured to interface with the plurality of Ethernet interfaces, a forwarding processor configured to rewrite forwarding addresses, an Internet Protocol (IP) interface processor configured to provide an IP-to-fiber channel over Ethernet (FCOE) conversion interface, an FCOE interface processor configured to provide SAN extension services and to process ingress and egress SAN traffic, a virtual output queuing (VOQ) application specific integrated circuit (ASIC) configured to provide VOQ functions for ingress and egress LAN and SAN traffic traversing the first network interface, and an arbiter interface module configured to arbitrate traffic for the VOQ ASIC and the FCOE interface processor for the ingress and egress LAN and SAN traffic traversing the first network interface,
wherein the plurality of processors is configured to:
maintain a services mapping of a plurality of transformations for transmission of a received packet to the remote LAN and a plurality of transformations for transmission of the received packet to the remote SAN;
receive a packet via at least one of the first or second network interfaces;
determine if the packet is routed to the local SAN or the local LAN, or remote LAN or remote SAN based on packet header information;
arbitrate the traffic for the FCOE interface processor and the VOQ ASIC;
in response to determining that the packet is routed to the remote SAN, perform SAN extension services with respect to the packet in order to extend the local SAN to the remote SAN and route the packet to the remote SAN according to the services mapping;
in response to determining that the packet is routed to the remote LAN, perform LAN extension services with respect to the packet in order to extend the local LAN to the remote LAN and route the packet to the remote LAN according to the services mapping;
in response to determining that the packet is routed to the local SAN, route the packet to the local SAN via the second line card; and
in response to determining that the packet is routed to the local LAN, route the packet to the local LAN via the first line card; and
otherwise forward or route the packet based on the packet header information.

14. The system of claim 13, wherein the FCOE interface processor is configured to:

insert one or more of a virtual LAN (VLAN) identifier (ID) and VLAN Ethernet type header information into the packet; and forward the packet.

15. The system of claim 14, wherein the IP interface processor is configured to:
receive the forwarded packet from the FCOE interface processor;
insert one or more of IP header, IP Ethernet type, and Transport Control Protocol (TCP) header information into the packet;
overwrite destination address information within the packet for forwarding the packet to a forwarding module; and
forward the packet to the forwarding module.

16. The system of claim 15, wherein the forwarding module is configured to:
receive the forwarded packet from the IP interface processor;
perform a destination address lookup;
overwrite destination address information within the packet based on the destination address lookup; and
forward the packet to the remote SAN.

17. The system of claim 13, further comprising a bridge application specific integrated circuit (ASIC) configured to provide an interface between the forwarding processor and the network processor, and configured to perform address rewrites based on address lookups by the forwarding processor.

18. The system of claim 13, wherein the plurality of processors further comprises a switching module configured to provide packet switching between the FCOE interface processor and the forwarding processor.

19. The system of claim 13, wherein in performing SAN extension services and LAN extension services, the plurality of processors is configured to perform one or more of Fiber Channel over Ethernet forwarding, Fiber Channel mapping, Small Computer System Interface/Fiber Channel Protocol termination, SANTap Disaster Recovery, Fiber Channel over Internet Protocol forwarding, IO Acceleration, and Data Compression, Q in Q, Layer-3 forwarding, Access Control List processing, Overlay Transport Virtualization/Multiprotocol Label Switching/Virtual Private LAN Services/Location-Identifier Separation Protocol processing, HQoS, Encryption, and WAN link mapping.

20. A method comprising:
maintaining a services mapping of a plurality of transformations for transmission of a received packet to a remote LAN and a plurality of transformations for transmission of the received packet to a remote SAN;
at a line card of a network edge device, receiving a packet via a first network interface configured to interface with a local local area network (LAN) and a local storage area network (SAN) or a second network interface configured to interface with the remote LAN and the remote SAN, wherein the second network interface comprises a plurality of Ethernet interfaces configured to connect the local SAN and the local LAN to an intermediate network that provides connectivity to the remote SAN and the remote LAN, and the line card comprises a network processor configured to interface with the plurality of Ethernet interfaces, a forwarding processor configured to rewrite forwarding addresses, and an Internet Protocol (IP) interface processor configure to provide an IP-to-fiber channel over Ethernet (FCOE) conversion interface;

determining, at the line card, if the packet is routed to a local SAN or local LAN, or the remote SAN or remote LAN;
arbitrating the traffic for a first processor of the line card configured to provide SAN extension services and a second processor of the line card configured to provide LAN extension services, wherein the first processor comprises a FCOE interface processor configured to process ingress and egress SAN traffic, and wherein the second processor comprises a virtual output queuing (VOQ) application specific integrated circuit (ASIC) configured to provide VOQ functions for ingress and egress LAN and SAN traffic traversing the first network interface, and wherein arbitrating the traffic comprises an arbiter interface module arbitrating traffic for the VOQ ASIC and the FCOE interface processor processing the ingress and egress LAN and SAN traffic traversing the first network interface;
in response to determining that the packet is routed to the remote SAN, performing, at the line card, SAN extension services with respect to the packet in order to extend the local SAN to the remote SAN and routing the packet to the remote SAN according to the services mapping;
in response to determining that the packet is routed to the remote LAN, performing, at the line card, LAN extension services with respect to the packet in order to extend the local LAN to the remote LAN and routing the packet to the remote LAN according to the services mapping;
in response to determining that the packet is routed to the local SAN, routing, at the line card, the packet to the local SAN; and
in response to determining that the packet is routed to the local LAN, routing, at the line card, the packet to the local LAN.

21. The method of claim 20, further comprising:
for ingress SAN traffic, inserting one or more of a virtual LAN (VLAN) identifier (ID) and VLAN Ethernet type header information into the packet.

22. The method of claim 20, further comprising:
performing a destination address lookup;
overwriting destination address information within the packet based on the destination address lookup; and
forwarding the packet to the remote SAN.

23. The method of claim 20, wherein in performing SAN extension services for the local SAN comprises:
performing one or more of data and application replication and mobility services for data and applications associated with the packet, disaster recovery, data throughput acceleration, data encryption, and data compression services for data and applications associated services with the packet; and
encapsulating the packet for transport to the remote SAN.

24. The method of claim 20, further comprising interfacing between the forwarding processor and the network processor to perform address rewrites based on address lookups by the forwarding processor.

25. The method of claim 20, further comprising packet switching between the FCOE interface processor and the forwarding processor.

26. The method of claim 20, wherein in performing SAN extension services and LAN extension services, the plurality of processors perform one or more of Fiber Channel over Ethernet forwarding, Fiber Channel mapping, Small Computer System Interface/Fiber Channel Protocol termination, SANTap Disaster Recovery, Fiber Channel over Internet Protocol forwarding, IO Acceleration, and Data Compression, Q in Q, Layer-3 forwarding, Access Control List processing, Overlay Transport Virtualization/Multiprotocol Label Switching/Virtual Private LAN Services/Location-Identifier Separation Protocol processing, HQoS, Encryption, and WAN link mapping.

* * * * *